3,027,379
ANTI-PATHOGENIC COMPOUNDS
Lloyd H. Conover, Quaker Hill, Conn., assignor to Chas. Pfizer & Co., Inc., New York, N.Y., a corporation of Delaware
No Drawing. Filed May 17, 1960, Ser. No. 29,564
5 Claims. (Cl. 260—294.8)

This application is concerned with new and useful anti-pathogenic agents. More particularly, it is concerned with the compounds, 2-(5-nitro-2-furfurylmercapto)-pyridine-1-oxide, 2 - (2 - furfurylmercapto)-pyridine-1-oxide and their acid addition salts. It is concerned also with pharmaceutical compositions containing these valuable compounds.

The compounds of this invention may be prepared by reaction between a furfuryl halide or a 5-nitro-furfuryl halide and 2-mercapto-pyridine-1-oxide. The reaction is carried out in lower alkanol or ketone solvents containing up to nine carbon atoms. There may be mentioned by way of example, methanol, ethanol, propanol, isobutanol, n-pentanol, acetone, methyl isopropyl ketone or n-dibutyl ketone. Because of their high solvent powers, it is often advantageous, although not necessary, to add up to 20% dimethyl formamide or dimethyl sulfoxide to the above-mentioned solvents to aid in bringing the reactants into solution.

The reaction is generally carried out by reacting approximately equimolar quantities of the reactants. An excess, say for example, up to 20% molar excess of either reactant can be used, but it is not necessary. Reaction is effected by maintaining the reactants in the chosen solvent or solvent mixture at a temperature of from about 50° C. to about 100° C. for a period of from about 1 to about 20 hours. In preferred operations, the reaction temperature is from 50 to 80° C. since above 80° C., there may be some tendency for the compounds to decompose. The product is isolated by removing most of the solvent in vacuo in an inert atmosphere, e.g., nitrogen, and recovering the precipitate. The mixture should not be evaporated to dryness except in an inert atmosphere since it may decompose violently.

The presence of the nitro group in the 5-position of the furfuryl halide greatly increases the activity of the halogen atom. It is, therefore, generally possible to effect reaction between the pyridine-1-oxide and the nitro-furfuryl halide under less stringent conditions than are employed when no nitro group is present.

The identity of the halogen atom on the furfuryl compound is immaterial although it is generally preferred to use a furfuryl chloride, bromide or iodide since these halogen atoms are known to be much more reactive for the type of reaction here employed, than is the fluoride atom.

It is specifically intended to include acid addition salts of the free bases within the purview of this invention. For pharmaceutical applications, the acid addition salts should, of course, be pharmaceutically acceptable. Typical pharmaceutically acceptable acid addition salts include the bromide, chloride, sulfate, phosphate, and citrate. Pharmaceutically unacceptable acid addition salts may be used for the purification of compounds of this invention. For example, the compound may be converted to a pharmaceutically unacceptable acid addition salt such as the fluoride. This salt may be recrystallized from a suitable solvent and then converted to the purified free base. Also certain acid addition salts, although pharmaceutically unacceptable, may be acceptable for agricultural use.

The salts may be prepared by means well known to those skilled in the art. For example, the free base may be taken up in a non-polar organic solvent such as ether, hydrocarbon or halogenated hydrocarbon solvents including carbon tetrachloride or hexane. The mixture is then contacted with the acid, for example, by bubbling hydrogen chloride, hydrogen bromide or hydrogen iodide into the mixture or by agitating the mixture in the presence of concentrated sulfuric, phosphoric or other acid. The acid addition salt is usually almost completely insoluble in the solvent. It will, therefore, precipitate and may be collected by filtration. Alternatively, the solvent may be removed by distillation in vacuo to leave the desired product as a residue.

The free bases of this invention, as will be recognized by those skilled in the art, may also be prepared by other procedures. For example, one may react mercaptomethylfuran with a 2-halopyridine-1-oxide such as 2-bromopyridine-1-oxide. One may also react the tosylate or mesylate of furfuryl alcohol with 2-mercaptopyridine-1-oxide. Reaction of 2-mercaptofuran with a 2-halopyridine-1-oxide also may be employed to obtain the desired compound.

The compounds of this invention manifest a high order of activity against a wide variety of pathogenic microorganisms including phytopathogenic organisms and those recognized as the causative agent in many ills afflicting animals including humans.

The table on the following page lists the minimum inhibitory concentration (mic.) in micrograms per milliliter (mcg./ml.) of 2-(5-nitro-2-furfurylmercapto)-pyridine-1-oxide against certain of these organisms.

| Organism: | Minimum inhibitory concentration in micrograms per milliliter |
|---|---|
| Proteus vulgaris | 12.5 |
| Escherichia coli | 12.5 |
| Pseudomonas aeruginosa | 25 |
| Aerobacter aerogenes | 25 |
| Candida albicans | 6.3 |
| Streptococcus pyogenes | 3 |
| Micrococcus pyogenes var. aureus | 25 |
| Pityrosporum ovale 12078 | 3 |
| Micrococcus pyogenes var. aureus | 6.3 |
| Streptococcus pyogenes | 25 |
| Streptococcus fascalis | 12.5 |
| Diplococcus pneumoniae | 25 |
| Erysipelothrix rhusiopathiae | 25 |
| Corynebacterium diphtheriae | 50 |
| Bacillus subtilis | 6.3 |
| Bacterium ammoniagenes | 6.3 |
| Aerobacter aerogenes | 25 |
| Escherichia coli | 25 |
| Salmonella typhosa | 12.5 |
| Salmonella pullorum | 12.5 |
| Klebsiella pneumoniae | 12.5 |
| Neisseria gonorrhoeae | 50 |
| Shigella sonnei | 25 |
| Erwinia amylovora | 50 |
| Salmonella gallinarum | 25 |
| Malleomyces mallei | 50 |
| Vibrio comma | 50 |
| Pasteurella multocida | 1.56 |
| Mycobacterium 607 | 1.56 |
| Mycobacterium berolinense | 1.56 |
| Candida albicans | 12.5 |
| Pityrosporum ovale Traub | 1.56 |
| Pityrosporum ovale 12078 | 1.56 |
| Saccharomyces cerevisiae | 12.5 |
| Micrococcus pyogenes var. aureus 376 | 25 |
| Micrococcus pyogenes var. aureus 400 | 25 |

| | |
|---|---|
| Micrococcus pyogenes var. aureus K3 | 50 |
| Micrococcus pyogenes var. aureus K4 | 50 |
| Candida albicans 8 | <1 |
| Trichophyton rubrum | <1 |
| Alternaria solani | <1 |
| Pythium debaryanum | <1 |
| Aspergillus niger | <1 |
| Penicillium funiculosum | <1 |
| Cladosporium (Hormedendron) cladosporoides | <1 |
| Pityrosporum ovale 12078 | <1 |
| Histoplasma capsulatum | <1 |
| Blastomyces brasiliensis | <1 |
| Blastomyces dermatitidis | <1 |
| Trichophyton sulfureum | <1 |
| Trichophyton violaceum | <1 |
| Sporotrichum schenckii | <1 |
| Hormodendrum compactum | <1 |
| Cryptococcus neoformans | <1 |
| Phialophora verrucosa | <1 |
| Pityrosporum ovale | <1 |
| Candida albicans 8 | 1 |
| Candida albicans 9 | 10 |
| Candida albicans 11 | 10 |
| Candida albicans 13 | 10 |
| Trichophyton rubrum | 10 |
| Torulopsis albida ATCC 1066 strain Y–1400 | 10 |
| Alternaria solani | <1 |
| Betrytis allii | 10 |
| Septoria nodorum | <1 |
| Endothia parasitica | <1 |
| Neocosmospora vasinfecta | <1 |
| Nematospora coryli | <1 |
| Ceratostomella ulmi (Ophiostoma) | <1 |
| Colletotrichum circinans | 1 |
| Verticillium albo-atrum | 1 |
| Physalospora malorum | <1 |
| Helminthosporium victoriae | <1 |
| Homodendrum resinae | <1 |
| Glomerella cingulata | <1 |
| Phoma betae | 10 |
| Diplodia zeae | <1 |
| Rhizoctonia solani | <1 |
| Pythium debaryanum | <1 |
| Helminthosporium species | <1 |
| Mycogone perniciosa | 10 |
| Erwinia amylovora | <1 |
| Penicillium sp. marathon number 7 | <1 |
| Rhizopus nigricans | <1 |
| Penicillium steckii | <1 |
| Aspergillus niger | <1 |
| Penicillium frequentans | <1 |
| Penicillium citrinum | <1 |
| Penicillium funiculosum | <1 |
| Aspergillus nidulans | <1 |
| Penicillium soppi | <1 |
| Aspergillus terreus | <1 |
| Aspergillus fumigatus | <1 |
| Paecilomyces varioti | <1 |
| Aspergillus flavus-oryzae group | <1 |
| Hormodendron sp. (Wehmyer) | <1 |
| Penicillium oxalicum | <1 |
| Saccharomyces cerevisiae | <1 |
| Schisosaccharomyces octosporus | <1 |
| Pullularia pullulans | <1 |
| Byssochlamys fulva | <1 |
| Cladosporium herbarum | <1 |
| Cladosporium (Hormedendron) cladosporoides | <1 |
| Endomyces fibuliger | 10 |
| Margarinomyces bubaki | <1 |
| Oospora lactis | <1 |
| Penicillium digitatum | <1 |

The notation < means "less than."

Similar results are observed with the denitro compound of this invention and with the pharmaceutically acceptable acid addition salts of both free bases. For example, the mic. of 2 - (2 - furfurylmercapto)-pyridine-1-oxide against *Pityrosporum ovale* Traub is only 12.5 mcg./ml. The mic. of this same compound against *Mycobacterium berolinense* is <0.78 mcg./ml.

The compounds of this invention may be used for the treatment of a large number of pathogenic conditions of plants and animals. The compound, 2-(5-nitro-2-furfurylmercapto)-pyridine-1-oxide, for example, may be used in the treatment of superficial mycoses. Superficial mycoses, or ring worm, is a disease of man and domestic animals. It is a fungus infection usually attributed to *Microsporum audouini* and/or *Trichophyton rubrum*. The infection usually takes place in a susceptible animal after some trauma to the outer skin, for example, a scratch. As indicated by the name, the infection spreads in a circular or ring-like manner from the primary focus and gradually becomes larger as the skin at the periphery becomes involved. The hair is usually dry, the skin is scaly and the hairs often break off near the skin.

In the treatment of superficial mycoses, the hair around the circular lesion is first clipped with the scissors and then removed down to the skin layer with a razor. The area is then washed and the active agent is applied either directly or in the form of a therapeutic composition using the usual pharmaceutically acceptable excipients and extending agents.

In one specific example, a number of dogs infected with ring worm were treated by applying a petrolatum base ointment containing 1% by weight of 2-(5-nitro-2-furfurylmercapto)-pyridine-1-oxide to the involved area. Prior to the treatment large areas of the skin were inflamed and covered with a scaly crust. Portions of the inflamed area were excreting a serous discharge. After treatment for two weeks the scaly tissue had disappeared, the discharge was no longer evident and the inflammation had decreased in severity.

The compounds of this invention may be administered with a variety of pharmaceutically acceptable excipients or extending agents selected from the class employed with similar medicinals. For treatment of skin conditions, ointments and powders are particularly useful. The extending agents used in these ointments or powders may be of the hydrophilic variety such as the various condensation products of ethylene and propylene oxide with ethylene and propylene glycol, or they may be of the hydrophobic types such as petrolatum and other hydrocarbon greases. For some applications, it may be desirable to prepare the therapeutic compositions in the form of dry powders with such agents as carboxymethylcellulose and alginic acid derivatives. These powders may be converted to emulsions or suspensions by the addition of water prior to application to the infected area. If it is desired to treat the condition with a dry powder, as for example, when the area to be treated is moist from serous discharge, an active agent of this invention may be mixed with a dry extending agent such as lactose or sorbitol.

The compounds of this invention can be used alone or as indicated above in admixture with pharmaceutically acceptable extending agents. For certain applications it may also be desirable that the therapeutically effective mixture contain medicinal agents other than the compounds of the instant invention. Therapeutic compositions containing as the principal active ingredient at least 0.1% and up to 95% of an active compound of this invention are useful. The therapeutic concentration of the chosen composition will generally depend on the severity of the condition being treated as well as all other factors. These factors can best be evaluated by the physician or veterinarian in attendance.

The following examples are given solely for the purpose of illustration only and are not to be construed as limitations of this invention, many apparent variations of

EXAMPLE I

2-(5-Nitro-2-Furfurylmercapto)-Pyridine-1-Oxide

A total of 48 grams of 5-nitro-furfurylchloride was added dropwise with stirring to 38 grams of 2-mercaptopyridine-1-oxide dissolved in 500 ml. of refluxing acetone. After a four-hour reflux period, three-fourths of the solvent was evaporated under nitrogen. The precipitated solid was filtered for 12 hours at room temperature. After drying, it weighed 45.9 grams. An additional 9 grams was recovered from the filtrate. The crude product decomposed at 160 to 165° C. Recrystallization from ethanol raised the decomposition point to 175° C.

Analysis.—Calcd. for $C_{10}H_8N_2O_4S$: C, 47.57; H, 3.20; N, 11.11. Found: C, 47.49; H, 3.23; N, 10.88.

EXAMPLE II

2-(2-Furfurylmercapto)-Pyridine-1-Oxide

A mixture containing 10 grams of furfurylbromide and an equimolar portion of 2-mercaptopyridine-1-oxide in 250 ml. of methanol was maintained at 50° C. for 20 hours. At the end of this time, the volume was reduced to 50 ml. in vacuo under nitrogen and the desired product, which precipitated recovered by filtration.

EXAMPLE III

2-(2-Furfurylmercapto)-Pyridine-1-Oxide

A total of 10 grams of furfuryl iodide and a 20% molar excess of 2-mercaptopyridine-1-oxide in a solvent mixture consisting of 200 ml. of di-n-butyl ketone and 40 ml. of dimethyl formamide was maintained at 100° C. for 1 hour. The volume was then decreased to a total of 50 ml. by evaporation of the solvent in vacuo under nitrogen. The desired product precipitated and was recovered by filtration.

EXAMPLE IV

2-(5-Nitro-2-Furfurylmercapto)-Pyridine-1-Oxide

A total of 15 grams of 5-nitro-furfuryliodide and an equimolar portion of 2-mercaptopyridine-1-oxide in 200 ml. of amyl alcohol containing 40 ml. of dimethyl sulfoxide was maintained at 50° C. for 10 hours. The volume was then reduced to 50 ml. by evaporation under nitrogen. The desired product precipitated and was recovered by filtration.

EXAMPLE V

2-(2-Furfurylmercapto)-Pyridine-1-Oxide

A total of 10 grams of 2-mercaptomethylfuran was dissolved in 150 ml. of sodium ethoxide solution prepared from 5.7 grams of sodium. To this mixture, there was added 22 grams of 2-bromopyridine-1-oxide-hydrobromide. The mixture was refluxed for 2 hours and then allowed to stand at room temperature for 72 hours. It was acidified slightly with glacial acetic acid and then taken to dryness in vacuo. The residue was extracted with hot acetonitrile, the extract concentrated to dryness and the crude product recrystallized from chloroform-benzene to yield 9.2 grams of white crystalline material, M.P. 147–148° C. Ultraviolet absorption maxima occur at 241 and 310, a shoulder at 265 and a minimum at 296 mμ.

EXAMPLE VI

Preparation of Acid Addition Salts 2-(5-nitro-2-furfurylmercapto)-pyridine-1-oxide hydrobromide was prepared by taking up a total of 5 grams of 2-(5-nitro-2-furfurylmercapto)-pyridine-1-oxide in 100 ml. of ethylene chloride and bubbling anhydrous hydrogen bromide in a slow stream through the mixture for 2 hours at approximately 25° C. The desired product formed and was recovered by filtration.

2-(2-furfurylmercapto)-pyridine-1-oxide sulfate was prepared by taking up a total of 10 grams of 2-(2-furfurylmercapto)-pyridine-1-oxide in 150 ml. of ether and adding an equimolar portion of concentrated sulfuric acid. The mixture was agitated for 2 hours at approximately 25° C. and the solvent removed in vacuo to leave the desired product as a residue.

Other acid addition salts including the hydrochloride, the hydriodide, the phosphate, the citrate and the fluoride were similarly prepared.

EXAMPLE VII

2-(5-Nitro-2-Furfurylmercapto)-Pyridine-1-Oxide

A total of 48 grams of 5-nitro-furfurylfluoride was added dropwise with stirring to 38 grams of 2-mercaptopyridine-1-oxide dissolved in 500 ml. of refluxing acetone. After a four-hour reflux period, three-fourths of the solvent was evaporated under nitrogen. The precipitated solid was filtered for 12 hours at room temperature. After drying, it weighed 45.9 grams. An additional 9 grams was recovered from the filtrate. The crude product decomposed at 160 to 165° C. Recrystallization from ethanol raised the decomposition point to 175° C.

What is claimed is:

1. A compound selected from the group consisting of 2-(5-nitro-2-furfurylmercapto)-pyridine-1-oxide, 2,(2-furfurylmercapto)-pyridine-1-oxide and their acid addition salts.
2. 2-(5-nitro-2-furfurylmercapto)-pyridine-1-oxide.
3. 2-(2-furfurylmercapto)-pyridine-1-oxide.
4. 2-(5-nitro-2-furfurylmercapto)-pyridine-1-oxide hydrochloride.
5. 2-(furfurylmercapto)-pyridine-1-oxide hydrochloride.

References Cited in the file of this patent

UNITED STATES PATENTS 2,686,786    Shaw et al. _____ Aug. 17, 1954

OTHER REFERENCES

Takashi et al.: Chemical Abstracts, vol. 44, pages 5373–74 (1950).